(12) United States Patent
Harrington

(10) Patent No.: US 10,930,314 B2
(45) Date of Patent: Feb. 23, 2021

(54) ENCODING DATA

(71) Applicant: Michael Hugh Harrington, Milwaukie, OR (US)

(72) Inventor: Michael Hugh Harrington, Milwaukie, OR (US)

(*) Notice: Subject to any disclaimer, the term of this patent is extended or adjusted under 35 U.S.C. 154(b) by 0 days.

(21) Appl. No.: 16/182,354

(22) Filed: Nov. 6, 2018

(65) Prior Publication Data

US 2019/0341076 A1 Nov. 7, 2019

Related U.S. Application Data

(63) Continuation of application No. 15/729,531, filed on Oct. 10, 2017, now Pat. No. 10,121,510, which is a continuation of application No. 15/231,772, filed on Aug. 8, 2016, now Pat. No. 9,786,318, which is a continuation of application No. 14/533,074, filed on Nov. 4, 2014, now Pat. No. 9,437,236.

(60) Provisional application No. 61/899,750, filed on Nov. 4, 2013.

(51) Int. Cl.
| | |
|---|---|
| *G11B 7/0045* | (2006.01) |
| *G11B 20/12* | (2006.01) |
| *G11B 5/74* | (2006.01) |
| *G11B 11/00* | (2006.01) |
| *B82Y 20/00* | (2011.01) |
| *G02B 6/12* | (2006.01) |
| *G11B 20/10* | (2006.01) |

(52) U.S. Cl.
CPC .......... *G11B 20/1252* (2013.01); *G11B 5/743* (2013.01); *G11B 7/0045* (2013.01); *G11B 11/002* (2013.01); *B82Y 20/00* (2013.01); *G02B 6/12007* (2013.01); *G11B 20/10* (2013.01)

(58) Field of Classification Search
CPC .. G11B 5/027; G11B 5/00; G11B 5/92; G11B 27/36; G11B 20/14; G11B 20/16; G11B 20/1419; G11B 20/12; G11B 20/1205; G11B 20/1219; G11B 7/00455; H04B 1/707; H04B 1/70712; H04B 3/46; H04B 17/00; H04J 13/10
USPC ................. 360/8, 24, 25, 31, 40, 44, 48, 50; 375/140, 130, 141, 143, 212; 369/108, 369/109.01
See application file for complete search history.

(56) References Cited

U.S. PATENT DOCUMENTS

| | | | | |
|---|---|---|---|---|
| 4,663,675 A * | 5/1987 | Jones, Jr. | ............... | H04M 1/652 360/32 |
| 5,559,832 A * | 9/1996 | Laird | .................... | G10L 19/012 341/143 |
| 6,452,960 B1 * | 9/2002 | Sato | ....................... | H04H 20/31 375/140 |
| 7,242,867 B1 * | 7/2007 | Clouinard | ............. | H04J 3/0685 398/45 |
| 7,269,114 B2 * | 9/2007 | Kim | ....................... | G11B 19/04 369/47.22 |
| 7,317,838 B2 * | 1/2008 | Renshaw | ............. | G06K 9/6202 382/233 |

(Continued)

*Primary Examiner* — Nabil Z Hindi
(74) *Attorney, Agent, or Firm* — Nolte Lackenbach Siegel

(57) ABSTRACT

Data can be transmitted and represented by signal gaps in a transmission, the gaps having various attributes. In various examples, data points are encoded and represented by the attributes of said signal gaps. Various attributes of such gaps, including duration, pattern, quantity, time, and/or coordination with a gap in another signal can represent data.

11 Claims, 14 Drawing Sheets

(56) References Cited

U.S. PATENT DOCUMENTS

| | | | | |
|---|---|---|---|---|
| RE43,019 E | * | 12/2011 | Chang | G11B 20/1217 |
| | | | | 369/59.25 |
| 8,411,569 B2 | * | 4/2013 | Matthews | H04N 21/23424 |
| | | | | 370/232 |
| 9,129,600 B2 | * | 9/2015 | Gibbs | G10L 19/20 |
| 9,769,796 B2 | * | 9/2017 | Hassan | H04W 72/04 |
| 2005/0141719 A1 | * | 6/2005 | Allen | G11B 7/0045 |
| | | | | 380/277 |
| 2011/0002393 A1 | * | 1/2011 | Suzuki | G10L 19/008 |
| | | | | 375/240.18 |
| 2014/0088973 A1 | * | 3/2014 | Gibbs | G10L 19/20 |
| | | | | 704/500 |

* cited by examiner

ENCODING DATA

CROSS-REFERENCE TO RELATED APPLICATIONS

The present application claims the filing date benefit of U.S. Provisional Patent Application No. 61/899,750, filed Nov. 4, 2013 and titled "ENCODING DATA," of U.S. patent application Ser. No. 14/533,074, filed Nov. 4, 2014 and titled "ENCODING DATA," of U.S. patent application Ser. No. 15/231,772, filed Aug. 8, 2016 and titled "ENCODING DATA," and of U.S. patent application Ser. No. 15/729,531, filed Oct. 10, 2017 and titled "ENCODING DATA," the contents of all said applications being hereby fully incorporated by reference.

BACKGROUND

Technical Field

The present disclosure relates generally to data encoding. More particularly, the disclosure relates to data encoding for storage, compression, transmission, and/or encryption of data.

Description of Related Art

Current platter or tape-based memory storage systems typically encode bits to grooves and notches, pits, and/or magnetic regions. Current solid state-based memory storage systems typically encode bits to integrated circuit components. Current memory storage devices may be susceptible to data destruction from electrical, magnetic, and/or electromagnetic events.

SUMMARY

In one embodiment, a method for encoding data is disclosed. The method includes inserting a signal gap in a transmission. The signal gap represents encoded data.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the disclosure to those skilled in the art. Non-limiting and non-exhaustive embodiments of the present disclosure are described with reference to the following figures, wherein like reference numerals refer to like parts throughout the various views unless otherwise specified.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
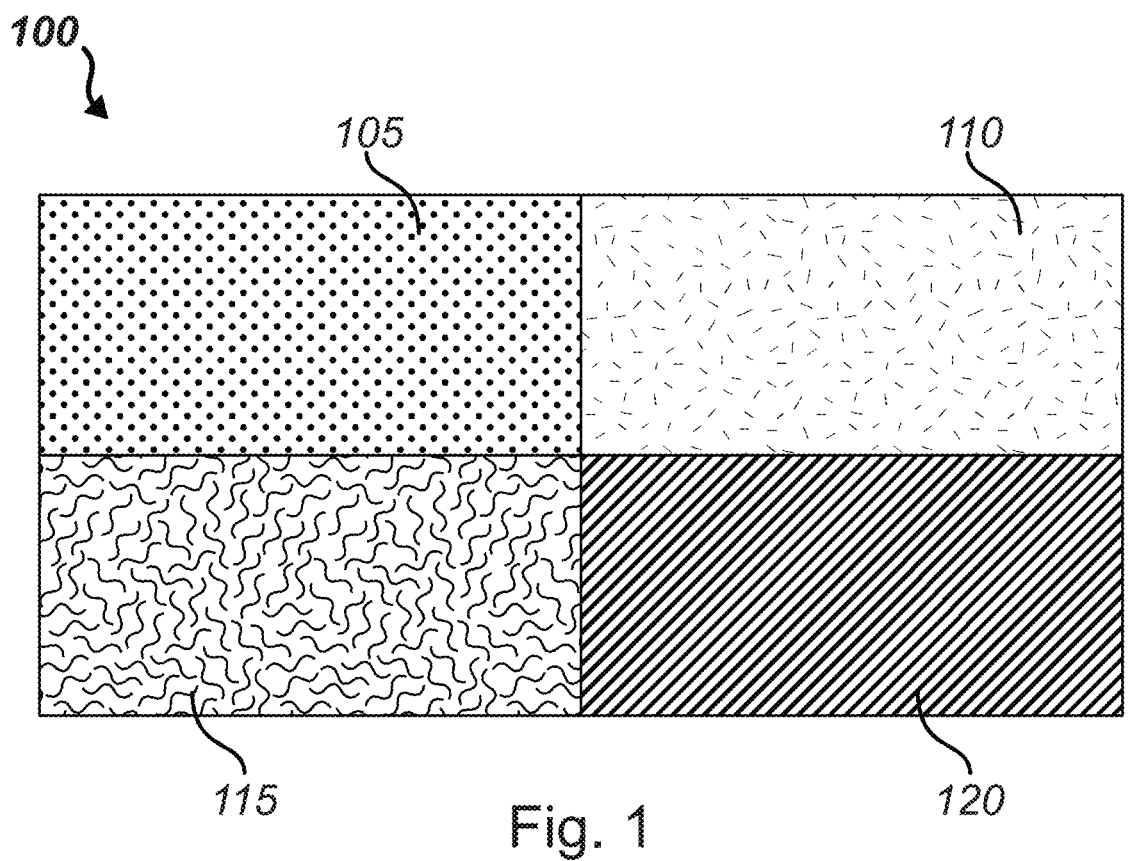
FIG. 1 is a depiction of color memory regions according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for encoding information in at least one of four schemas: color, shape, holes, and scaling. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In general, binary encoding utilizes a numeral system comprising ones and zeros, where each single datum, known as a bit, has two possible outcomes, a 1 or a 0. Binary scales with a potential valuation of X bits may result in $X^2$ potential outcomes.

In some embodiments of the present disclosure, information is encoded as one or more colors printed and/or constructed on a medium. A color can be defined by a specific wavelength or a wavelength range along a continuous spectrum; thus a virtually infinite number of distinct colors may comprise digital representation of a corresponding number of characters. Recent breakthroughs in so-called "Invisibility Cloak" technology may allow precise control over specific frequencies of light waves.

Colors can be read from a recorded medium by lasers and/or imaging devices, which may allow for light-based microchips to read such media at high speeds relative to conventional memory storage technology.

According to some embodiments of the present disclosure, color aspect allows for some "negater colors" if desired; for example: white can indicate a new subsection while black can outline shapes, as will be detailed further in the following sections of the present disclosure. Variety of color selection may be limited only to the detector available for the data medium.

A color-based recording medium as described above can be used with many existing and theoretical data recording types.

As an example, an embodiment is provided that encodes data to 10 million distinct colors, each color representing a unique value. Each unique value may be the equivalent to more than 23 bits held in a traditional binary-based memory storage device.

In embodiments, a recording medium may be supplemented for additional encoded information by recording colors with other detectable features such as conductivity, magnetism, opacity, reflectiveness, abrasiveness, bar-codes, or transparency. Other detectable properties may additionally be recorded on a recording medium. For example, embodiments of the present disclosure include using multiple detectable colors in one location, for instance by printing both ultraviolet and red in one cell.

In some embodiments, data is encrypted by customizing the color and/or encoding scheme for a specific application. Altering color in predetermined ways at predetermined specifications can also further enhance encryption security similar to password protection.

Referring to FIG. 1, a close-in view of a set 100 comprising four color-coded sections 105, 110, 115, 120 is depicted, where each pattern represents a different color. If the four depicted regions had access to 10 bits worth of possible different colors, this set 100 would represent $4\char`\^(2^{10})$ potential outcomes. In embodiments, infrared, ultraviolet, and or other spectrums may also be used as possible colors. In one embodiment, regions may be encoded with multiple colors that are detectable only under the particular circumstances, for example an ultraviolet dye on top of a red cell where each color dye is detectable by monitoring for the corresponding wavelength. In another example, different detectible mediums may be layered in a region, for example using infrared in silicon layers to detect patterns underneath the top layer of silicon.

In one embodiment, an infrared laser beam is focused within a silicon substrate to make structures, lines, tunnels, and dots inside silicon wafers or other substrates without damaging the surface of the substrate. In theory, by using multiple interior levels it could be possible to get as high as triple the total data storage capacity. According to an embodiment, the infrared laser beam melts a minute volume of silicon inside the structure, thereby creating a void. By passing the laser beam through the material, voids of virtually any size or shape may be created without altering the surface of the silicon substrate.

Figure 2:
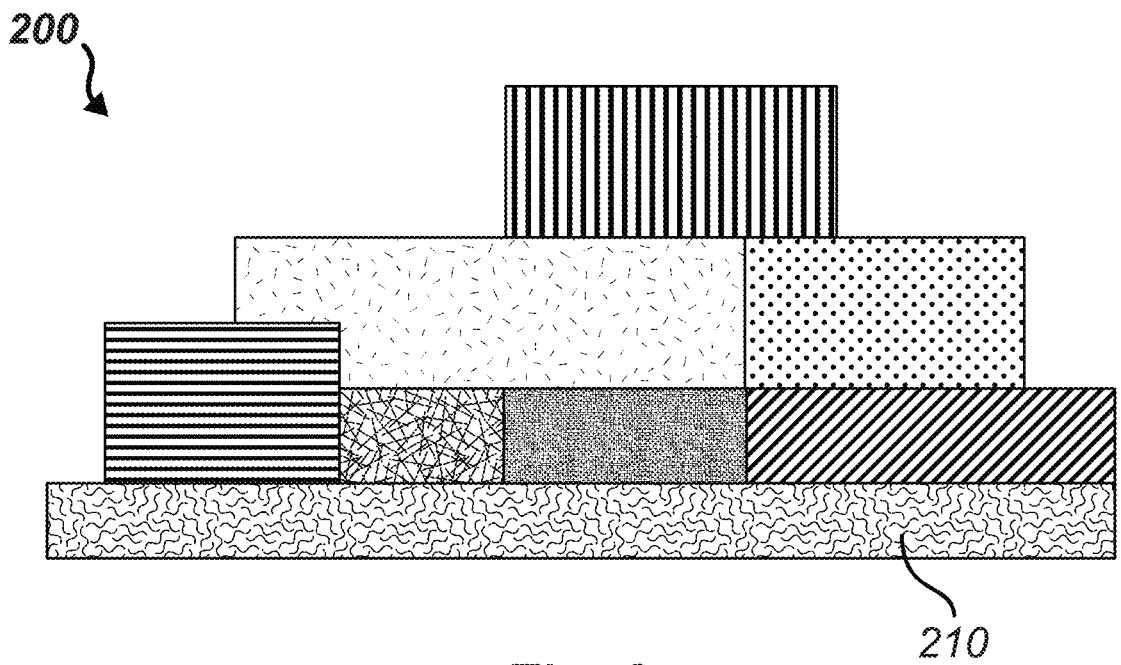
FIG. 2 is a depiction of memory regions having various sizes, colors, and shapes on a memory storage medium according to embodiments of the present disclosure.

FIG. 2 represents a set 200 of regions having various sizes, colors, and shapes on a memory storage medium 210 according to embodiments of the present disclosure. In one embodiment, a shape can be an encoded representation of information recorded on the storage medium 210. In embodiments, a shape is created by outlining the shape on the storage medium 210 with "1" values and filling the shape with "0" values. In such embodiments, shapes can be used in conjunction with many traditional memory storage media. In other embodiments, a physical shape is created using three-dimensional printing methods on a medium 210. Each unique shape may represent a coded piece of data. By creating features on a storage medium 210 having a variety of sizes and shapes, a large amount of information can be represented on a relatively compact space. Shapes can be generated via electronic designations, via physical representations, and via detectable representations such as light displays.

Information may be encoded as shapes comprising a three-dimensional or two-dimensional layout in physical form. Other dimensions may be usable in other formats. Shapes allows for sections of a memory device to have actual or virtual defined and detectable shapes. A shape-based drive can be space-defined (for example: 10,000 bits by 1,000 bits by 50,000 bits), be limited to a specific binary count (for example, 10,000 bits or 450 nodes and/or 15 pieces), allow or disallow empty spaces, or have other user or automated defined parameters.

A three-dimensional feature on a storage medium can be manifest in a one or two dimensional layout by re-creating "slices" of the feature in multiple one- or two-dimensional data sets. Features which comprise multiple layers can have outlines, different tones, or other identifiers to indicate start and/or end points.

A shape-based storage medium may provide for an index representation or other reference to indicate a "start point" of a memory storage region (for example, a deliberate marking, a special starting color, a particular shape, other marker, or a combination thereof). The start point may vary with media type and/or recording methods (for example, if the drive sensors are attached at creation of the medium, a reference may not be needed, or if the reference shape is unique).

One benefit of using shapes in a recording medium according to the foregoing description is that a specified method for creating shapes and their placement can result in strong encryption of the information encoded into the media. It is possible to encrypt data saved using a shape-based medium by providing shapes or a lack of shapes to selected regions or otherwise having special additions or removals to the shape-based code. This method of encryption may be effective because resolving the encrypted information may involve a "brute force" method of trying all possible shape sizes, all possible formations, and all possible manners to generate a shape-based data source. A brute force approach may grow in complexity as file sizes increase and/or as the variety of shapes increases.

Shapes can be combined with color encoding, as described above, and/or scaling encoding, as will be described below. A shapes-based memory system may include holes to further increase memory capacity (given enough physical structure to maintain structural integrity of the shapes). In an embodiment, scaling, color, holes, and/or shapes can be used in different manners, alone, or in conjunction with one or more of the others to achieve encryption.

Some examples of shape-based memory devices include colored spheres with poles, a topography style up/down map of colored mixed length poles, building blocks in a tight square, and two layer fields of colors having the appearance of double-sided printed paper. Embodiments of shape-based memory devices may have similarity to a Rubik's cube puzzle, in that a set physical combination of various blocks may signify a specific encoded piece of data.

In embodiments, shapes may also be recorded and detected at smaller levels than a color region might be recorded and detected. Accordingly, embodiments of the present disclosure comprise shapes inserted inside a single color region on a medium, thereby increasing the bit count per location involved.

Figure 3:
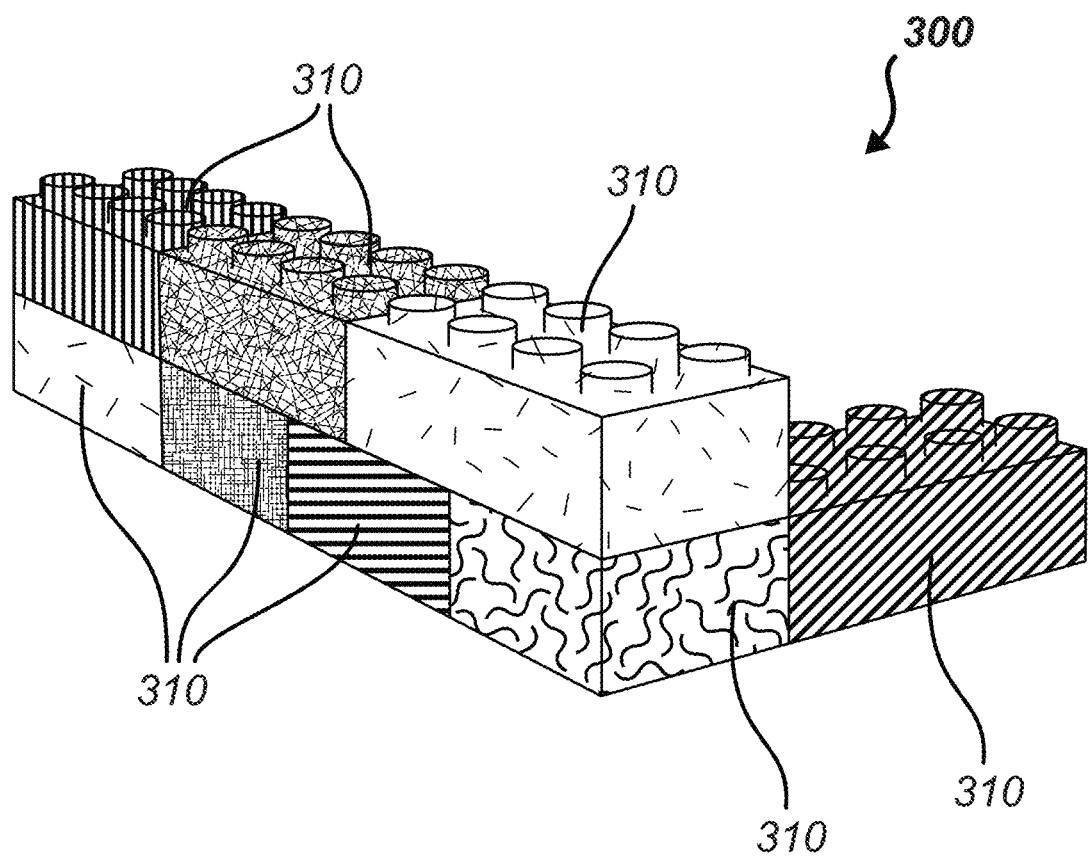
FIG. 3 is an illustration of a shape-based storage medium in accordance with embodiments of the present disclosure.
Figure 4A:
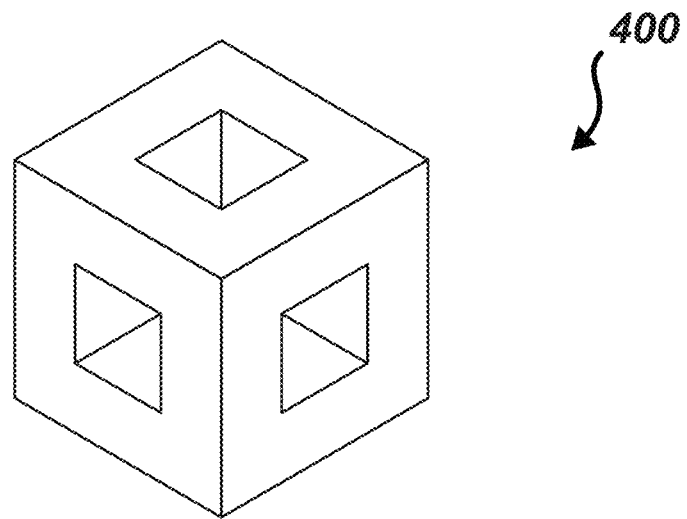
FIGS. 4A-4K set forth potential legal shapes in a 3×3×3 space according to one embodiment of the present disclosure.
Figure 4B:
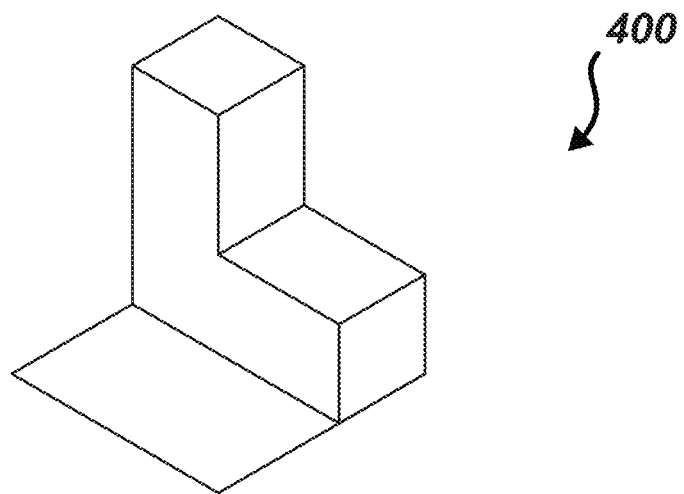
Figure 4C:
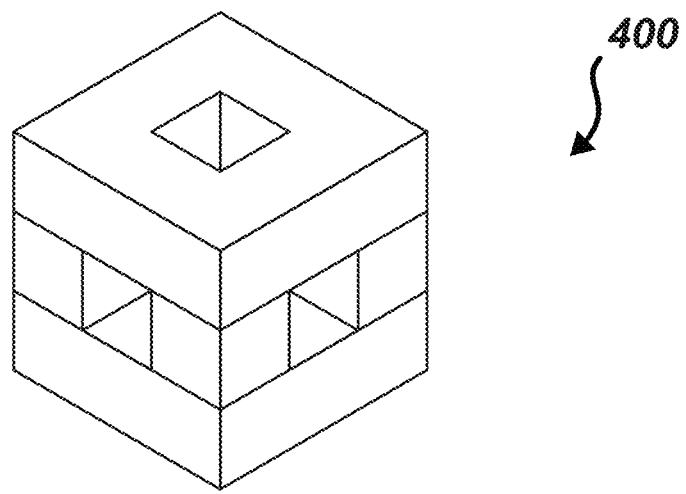
Figure 4D:
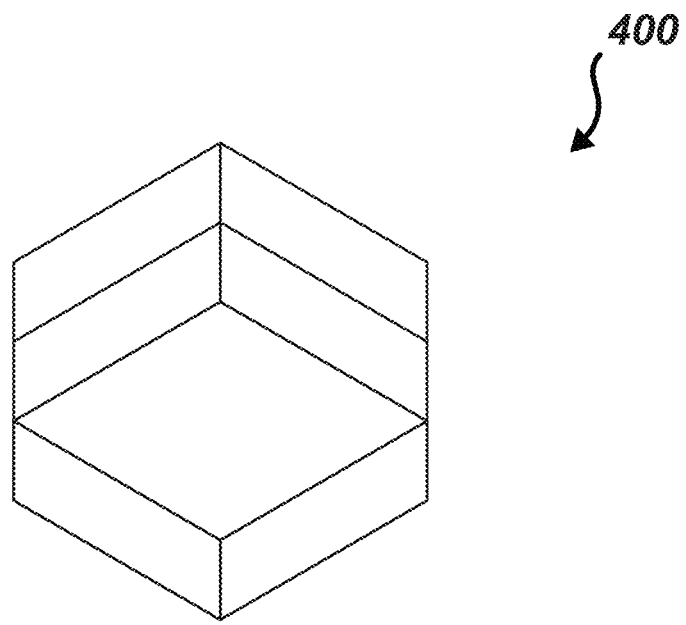
Figure 4E:
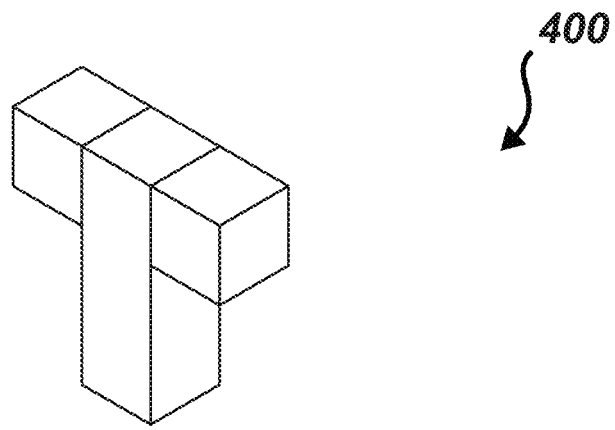
Figure 4F:
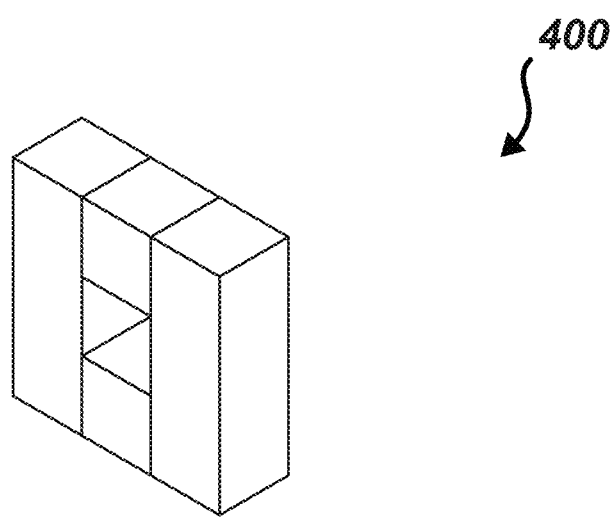
Figure 4G:
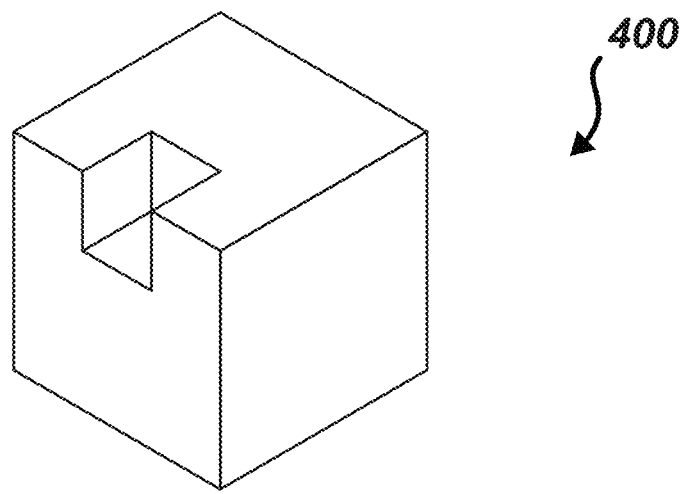
Figure 4H:
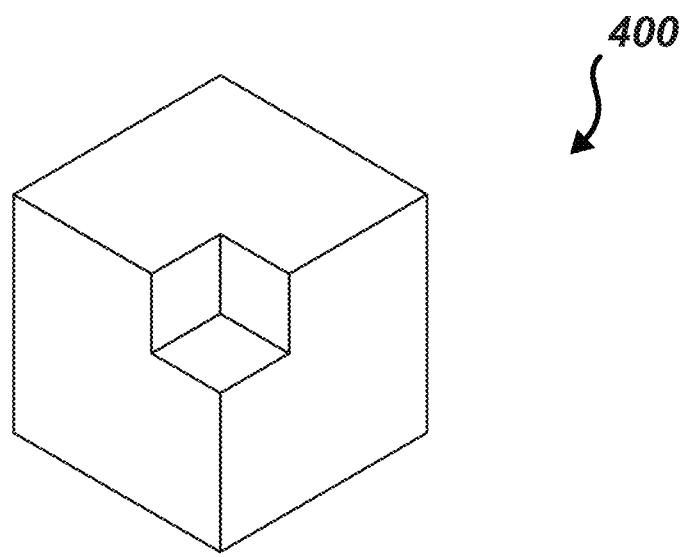
Figure 4I:
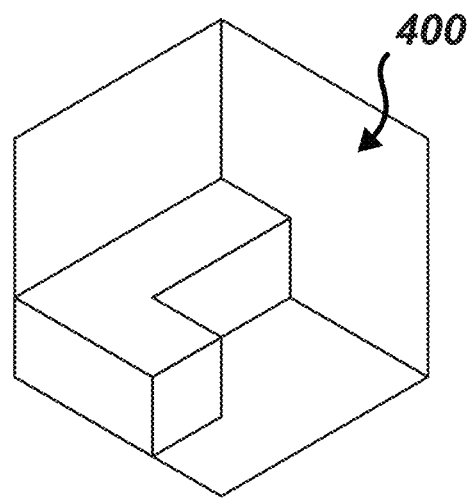
Figure 4J:
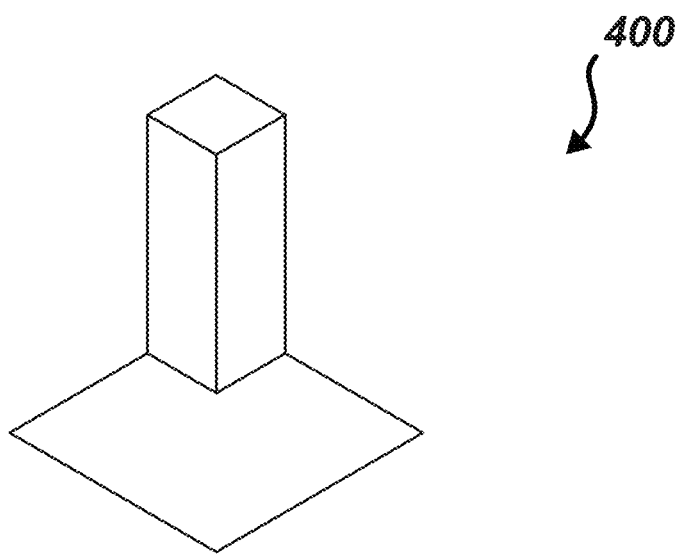
Figure 4K:
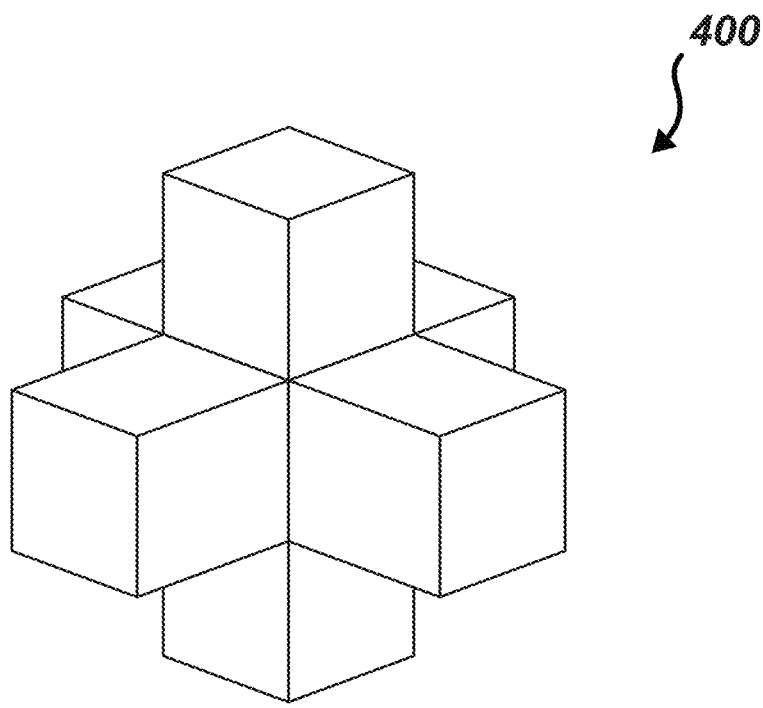

For illustrative purposes, an example of a shape-based storage medium is depicted in FIG. 3 as an assembly 300 of building blocks 310. The blocks 310 represent encoded data stored in a three-dimensional shapes, size, and colors.

Referring to FIGS. 4A-4K, in one embodiment, the following method may be followed to derive exact counts in a confined box with empty spaces allowed:

Let S be the set 400 of solid unit cubes in $R^3$ with all vertices at lattice points.

A legal object is a subset X of $R^3$ such that:
(1) X is a nonempty, finite union of elements of S;
(2) The interior of X is connected; and
(3) Congruent objects are considered the same.

From the foregoing postulates, it can be determined that each point has a maximum value of 9, where 9 is the number of combinations possible on connections, no connection, or no object, whereas border cubes have a 6, 3, or 2 for possible outcomes. In most of the probable outcomes the average may be less than 9 but more than 7, so for clarity it may be assumed that the probable outcome is 8, which represents 3 bits per grid coordinate. Using printed colors and sacrificing 1 bit rom then renders this possible (and more) or final count a growth of 2 bits per location.

According to embodiments of the present disclosure and the foregoing description, FIGS. 4A-4K set forth potential legal shapes in a 3×3×3 space.

Figure 5:
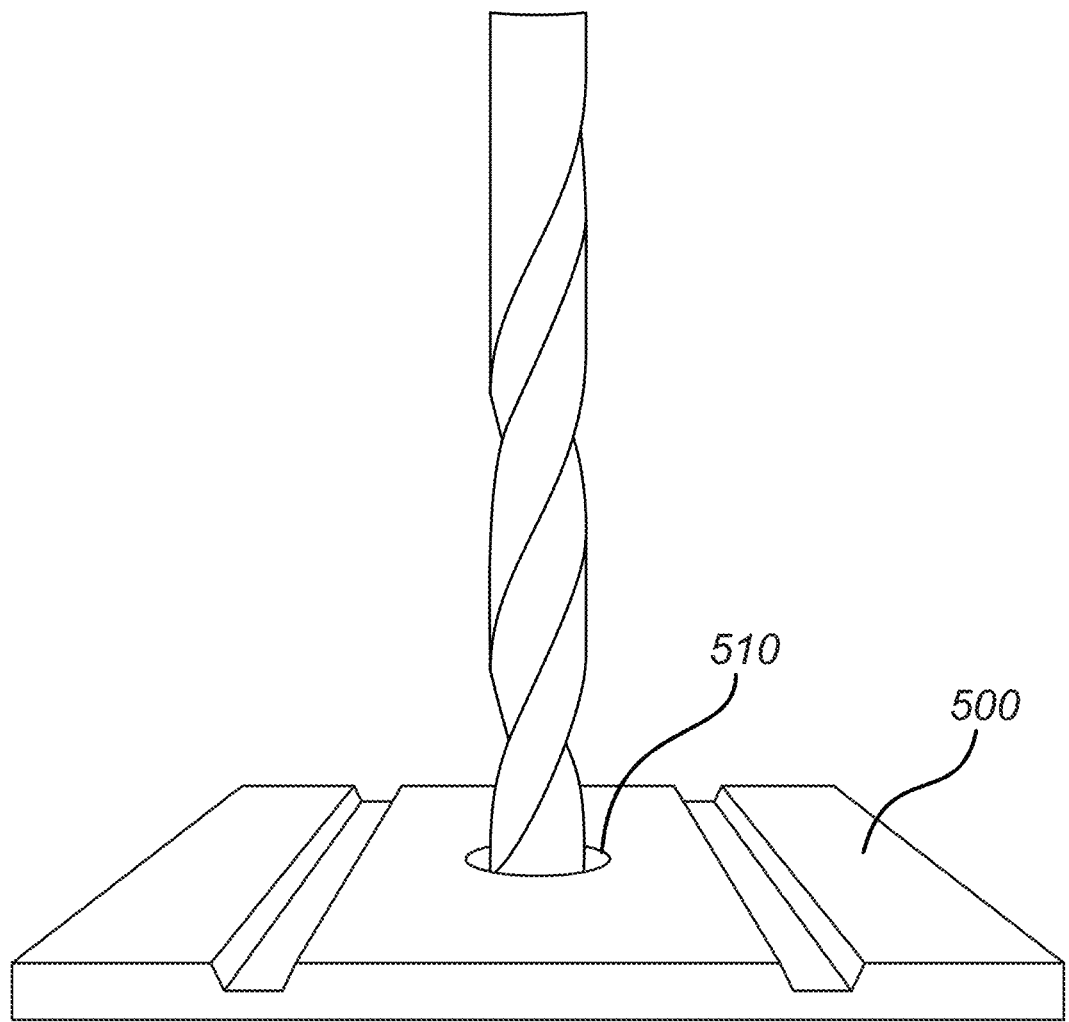
FIG. 5 depicts creation of a hole in a memory substrate according to an embodiment of the present disclosure.

One aspect of the present disclosure is missing spaces. Referring now to FIG. 5, in various embodiments, holes may be manifest in a CD-ROM, magnetic hard drive surface, or other memory storage substrate 500 as drilled holes 510. Where the total data in a drive or a portion of a drive is the line number on Pascal's Triangle, the maximum number of allowed holes represents the column. This representation may be ideal and difficult to reproduce in the real world, however, because integrity of the drive may be compromised with holes cutting out an entire section of the storage medium. According to embodiments, structural integrity may be augmented with a secondary medium so that holes in a primary storage medium do not create a gap in the underlying structure. In one embodiment, as an approximation, a 10% increase in total data density may be possible by adding holes to an original storage medium.

In one embodiment, an aspect of the present disclosure comprises controlling the orientation of subgroups. According to an embodiment, a subgroup can include any feature on a memory surface that represents encoded data. Using headings of a compass as an analogy: instead of only detecting 360 degrees, by increasing the number of headings to, for example, 1024 different headings, each subgroup could in theory add 10 bits outright.

Embodiments of the present disclosure include a variety of features on a storage medium. Such features can include colors, lines, dots, shapes, irregular heights, holes, textures, and variable sized drives to increase potential memory storage capacities. One embodiment comprises the use of such features using a standard region size of 50 nm×50 nm. However, virtually any other sizes of regions may be used.

According to various embodiments, data may be encoded in holes in a memory substrate. As an example, ten holes in a 100 bit section of a traditional memory region costs 10 bits but may add 26 bits. This modification represents a 16% increase to an existing memory system. Pascal's Triangle provides the key to understanding this, as the locations of the holes are essential in how the data is encoded.

In embodiments, ongoing communications can use an absence of data, or the representation of absent data, where single or parallel communications are taking place. An absence of data can also be referred to as a hole or a gap (whether simulated or real) that may result in an increase in total data density in the transmission. These absences are representations of combinations-based mathematics in how said absences transmit data. Combinations-based mathematics may also be capable of being rendered by usage of Pascal's Triangle. The set rate or length of each portion of a transmission being altered with this method can be determined prior to transmission or as part of the transmission, for purposes of decoding at the receiver. This is either a pre-set setting (hardcoded or determined on the spot) or is part of a normal header containing information about the transmission.

In embodiments, particular physical attributes of holes can represent data. For example, the shape, width, and/or angle of a hole can constitute possible outcomes representing data. Any such attributes that can be detected may function to encode data. For example, a system similar to a current CD-ROM data reading system using a laser may be able to detect different hole shapes such as a square, star, or a circle. In one embodiment, physical features can be added to the surface of a CD In embodiments of the present disclosure, information can be encoded in certain spatial relationships of one or more objects on a data storage medium. According to embodiments of the present disclosure, scaling includes the act of imposing different limits upon the data and then possibly allowed variances. Scaling may be useful in physical drives by providing a data compression effect. One example of scaling a color-based data storage medium may include the use of an off-white to divide a physical drive into two parts. The two divisions may be unequal or equal in size and/or shape.

Another example embodiment includes defining maximum lengths, heights, and/or widths of objects on a recording medium, and then allowing for shorter versions of the object to be made. In this example, a large data bank could be broken into a thousand different drives of a gigabyte each in size. Since each drive in this embodiment is a gigabyte, transferring to a maximum length drive may result in reducing the height, width, and/or length of the drives, thereby achieving some physical drive size reductions. A drive divided into segments can include segments that can represent a smaller binary value. The value range of x to $x^{2000}$ may result in a value equivalent of $x^{10}$, in which case a smaller segment can be used to represent the value without damaging the code.

In embodiments, scaling allows for empty spaces, or voids, in a set of data objects. A void itself may represent encoded information. Alternatively, a single color spot can designate a variety of possible color schemes and an "out of color" item could indicate a new section. The resulting storage medium can have millions of different possible drive schematics in color alone, which can under some circumstances result in effective data storage compression due to scaling of subsections.

Scaling can be structure specific. For example, a three-dimensional physical drive may have a rule that one corner has a cube-shaped hole and another corner is missing a small line leading to another corner. Allowing one specific piece in a colorless and shapeless drive to be removed could lead to a 50% increase in stored data. Alternatively, it could allow an additional spot to be filled.

One aspect of scaling is it can scale in multiple ways at the same time. This means different things at different locations, such as scaling for missing bits, scaling for a reduction in total length, and using colors to create multiple subsections of differing sizes.

In embodiments, scaling can also result in encryption of data if used as part of a key. For example, a password can, by definition, scale specific subsections of a given memory storage.

Embodiments of scaling schemas include different depths, heights, and elevations of physical shapes. Combining color, shaping, and scaling schemas may lead to compression and encryption capabilities. A gigabyte file has 8,589,934,592 bits. Using a color spectrum of 20 bit-equivalent types with 1 spare color may result in a very large amount of data stored in a similar space relative to traditional data storage methods. Objects can be arranged in a variety of manners, such as 2×2×2, 1×2×4, 1×1×8 or virtually any other spatial arrangements.

Within these potential variations are a number of potential outcomes. To further enhance storage capacity, one can designate a variable number of objects as removable from the storage medium. By removing two clusters, an increase in the size of the data that can be encoded may be realized. Further, storage capacity can be dramatically increased by dividing the medium using the spare color into variable-sized subsections.

A short Pascal's Triangle demonstrates compression capabilities with only scaling:

```
              1 1
             1 2 1
            1 3 3 1
           1 4 6 4 1
          1 5 10 10 5 1
         1 6 15 20 15 6 1
        1 7 21 35 35 21 7 1
       1 8 28 56 70 56 28 8 1
```

This table demonstrates if scaling 8 bit groups, one can get one result with 8 bits, eight results with 7 bits, twenty-eight results with 6 bits, fifty-six results with 5 bits, seventy with 4, and so forth. Structural integrity considerations of the physical objects may limit scaling to a 3 bits removed. However, with $\log(x)/\log(2)=x$ formula removing one bit results in 7+3, 2 bits is 6+4, 3 bits is 5+5 (with rounding). The actual number of outcomes possible is 4864. Since 4096 is 12 bits this means that a reduction of 3 bits may add 50%+ to the size of an 8-bit file.

Alternative embodiments also exist, for example movable magnetic memory mixed with inert or differently colored pieces (where every pieces has grooves to facilitate being moved by a mover to an open space), other methods to negate one or more magnetic memory bit location(s), alterations on other memory devices where a color or shape or scaling method is used, or even in transmissions where scaling is used to supplement existing transmission methods.

In embodiments, existing hard-drives with magnetic regions may also be used in methods described herein. For example, a platter surface can be made without a region in certain spots to produce a second set of hard-code in existence with normal drive capabilities. Similar methods can be carried out with shapes, scaling, and colors.

Embodiments of the present disclosure include plastics fabricated to hold a magnetic field, which may add to the "bit count" of a given memory device. Similarly, a number of metal paints and other materials may be used in like manner.

Figure 6A:
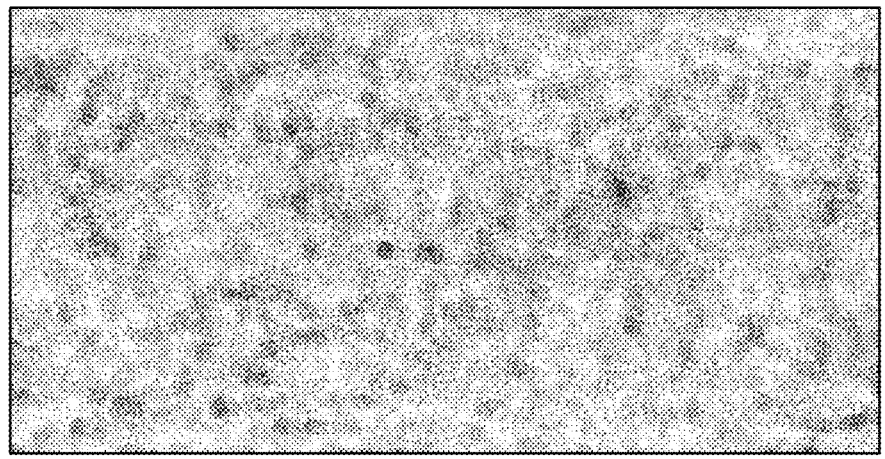
FIGS. 6A and 6B depict examples of a color-based scaled memory storage medium according to embodiments of the present disclosure.
Figure 6B:
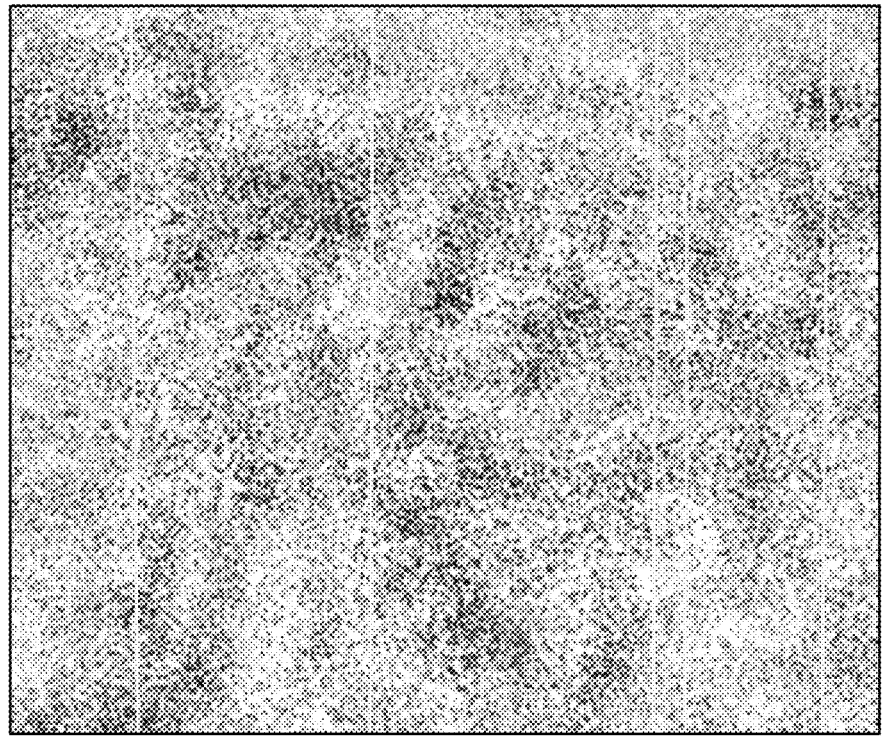

Referring now to FIG. 6A, an example depiction of a color-based scaled memory storage medium is depicted. The medium has specific subsections created with the use of an additional color to break up the portions clearly. FIG. 6B is a second example of a color-based scaled memory storage medium. Each pixel depicted in the media depicted in FIG. 6A or 6B may be a separate functional "multibit" color portion. In some embodiments, the white regions represent a void used in scaling.

Figure 7A:
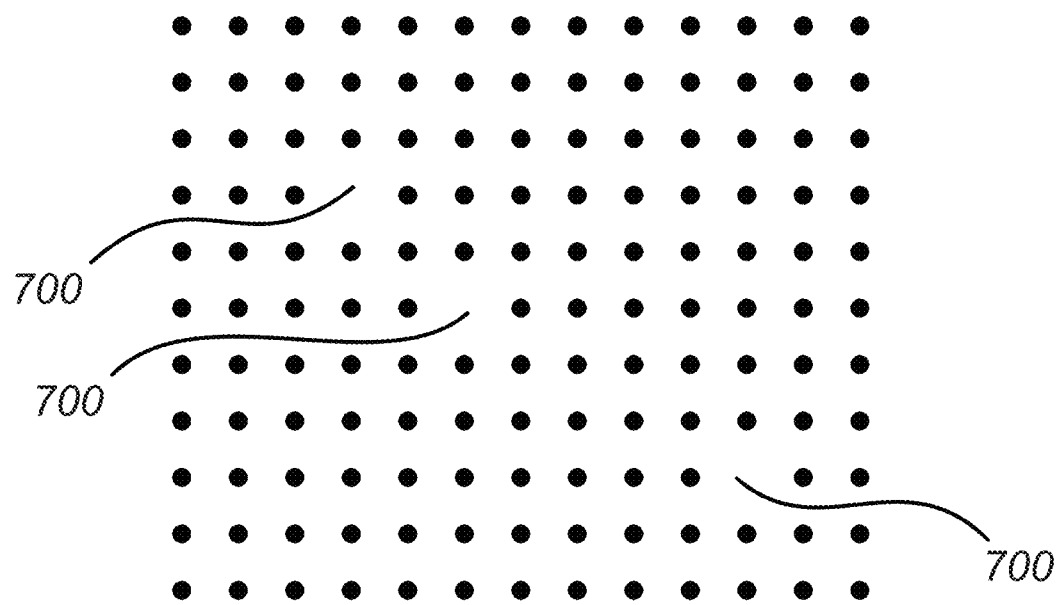
FIGS. 7A and 7B depict examples of magnetic drives regions having missing regions according to embodiments of the present disclosure.

FIG. 7A is an 11×13 example of magnetic drives regions where some regions 700 are missing according to one embodiment of the present disclosure. Normally there may be 143 regions, however this example only has 140 regions. In this example, the locations of the missing portions 700 may represent hardcoded values. To derive the capacity of this embodiment, one may create a Pascal's Triangle to 143 bits and find the corresponding section which represents 3 missing 0s or 1s to determine how many possibilities exist. The possibilities may be determined to be X, where the following formula may be used to derive the binary value:

$$\mathrm{Log}(X)/\mathrm{Log}(2)=\mathrm{Bit\ Count}$$

Figure 7B:
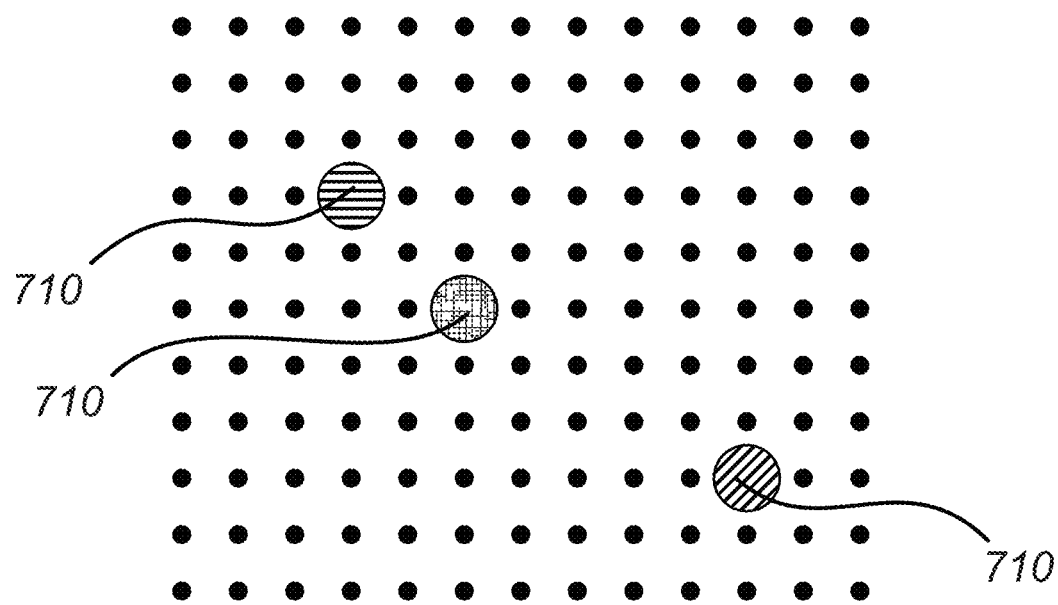

FIG. 7B demonstrates a magnetic drive and its regions where missing regions 700 have been replaced by color-coded regions 710 according to one embodiment of the present disclosure.

Modern three-dimensional printing technology has advanced to the point where plastics, metals, and even organic matter can be printed at remarkably small levels. Technology has been greatly expanding to the point where printing can be done at 10 micron resolution and is expected to get smaller as the technology matures. Memory storage on a CD-ROM according to current technology may take up a space of about 2.4 microns by 2.1 microns per bit. The visible light spectrum is approximately 400 to 700 nanometers in size (0.4 to 0.7 microns). Thus, light currently affords a greater potential memory density than some current memory types.

According to embodiments, with the advent of three-dimensional printing and, using advanced imaging technology, greater than 24 bits worth of encoding is possible based on the light spectrum.

Manufacturing shapes on a memory storage medium may be carried out using nano-scale manufacturing operations currently familiar to one of ordinary skill.

In one embodiment, alignments of lines on a memory substrate constitute one potential schema wherein subsections have their own alignment compared to other subsections. Additionally, interruptible rays from a central source (in other words, line segments) with multiple central sources (wherein the locations of these central sources may be virtually anywhere on a memory substrate), a means to encode vast sums of data may be realized.

Figure 8:
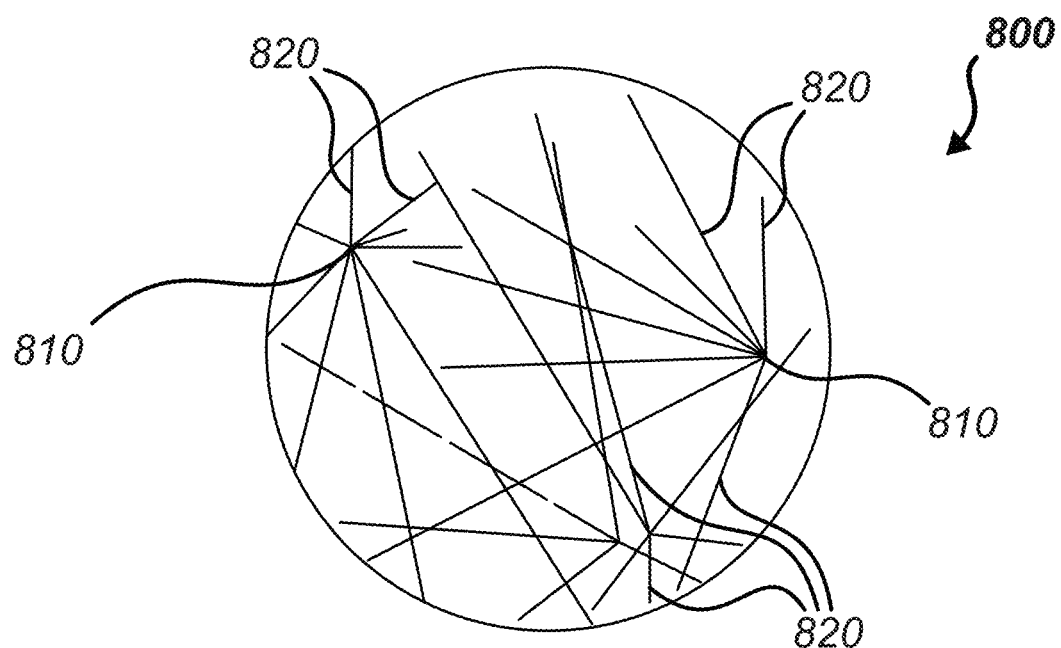
FIG. 8 depicts a memory substrate with various focal points and lines according to an embodiment of the present disclosure.

FIG. 8 represents a silicon wafer 800 with various focal points 810, depicted where lines 820 originate. According to various embodiments, lines 820 can be continuous, broken, cross other lines, or even be indicated (via depth, color, or other means) to go under and/or over another line 820. According to various embodiments, the number of foci 810 are not be fixed. In one embodiment, space not used for the lines 820 can be exploited for other memory holding schema 830 so long as those methods are clearly separate in nature.

According to embodiments of the present disclosure, data may be encoded by locations where lines 820 come from a focal point 810, the lengths of lines 820, locations of breaks and gaps, and/or headings of lines 820. Thus, each length of a line 820, each gap within a line 820, etc. can hold a value. In one embodiment, focal points and/or lines are created in two-dimensional structures, three-dimensional structures, and combinations thereof.

In one embodiment, additional features of lines 820 and/or focal points 810 may encode additional data. For example, the depth, width, and/or length of lines 820 or focal points 810 can represent encoded data. Variations in line 820 thickness, depth, etc. along the length of a line 820 can likewise represent encoded data. In embodiments, placement of intersections of lines 820 can represent data.

Figure 9A:
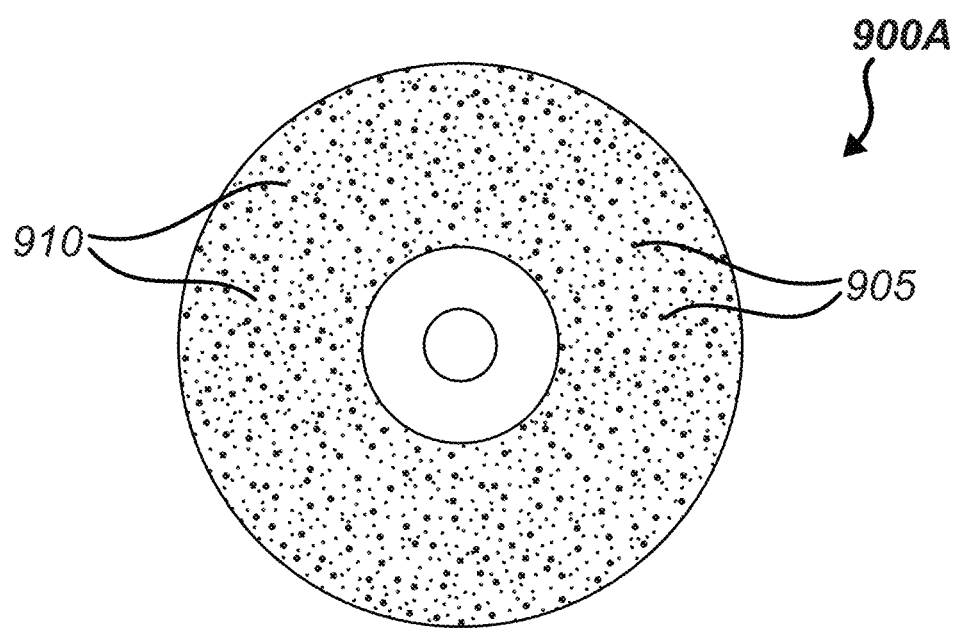
FIGS. 9A-9D set forth various memory substrates according to embodiments of the present disclosure.

Referring now to FIGS. 9A-9D, two- or three-dimensional features may be provided on memory surfaces to encode data according to embodiments of the present disclosure. FIG. 9A depicts a CD-ROM 900A data surface having holes 905, 910 of various sizes thereon, each hole 905, 910 size and/or location being a physical representation of encoded data.

Figure 9B:
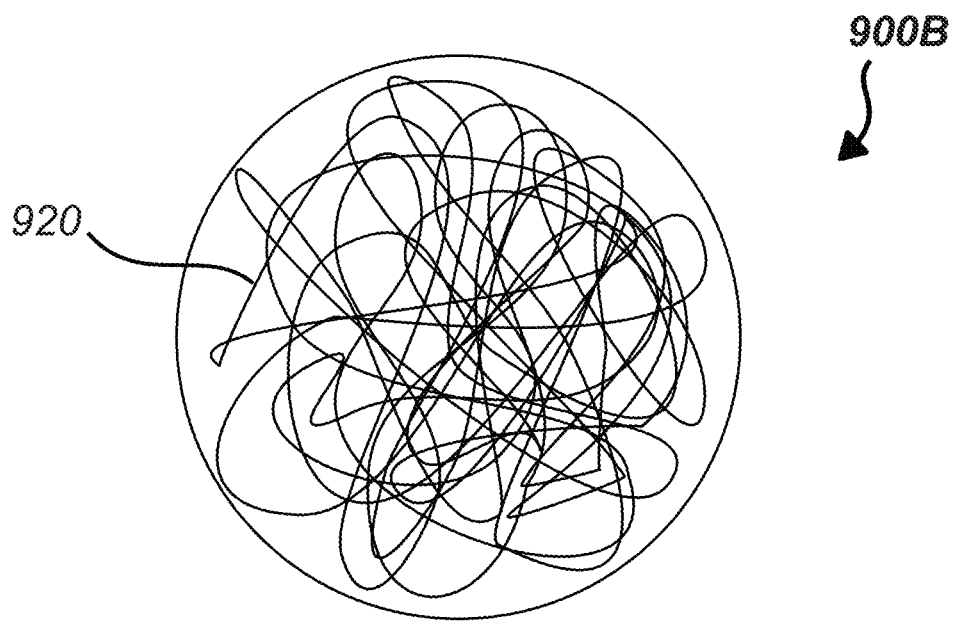

FIG. 9B depicts a data surface 900B having a single, continuous line 920 etched and/or printed thereon. In one embodiment, locations, curvatures, depths, thicknesses, and other physical attributes of line 920 comprise physical representation of encoded data. In one embodiment, line 920 includes tunnels and crossing paths (which may be shown by increasing the depth of line 920).

Figure 9C:
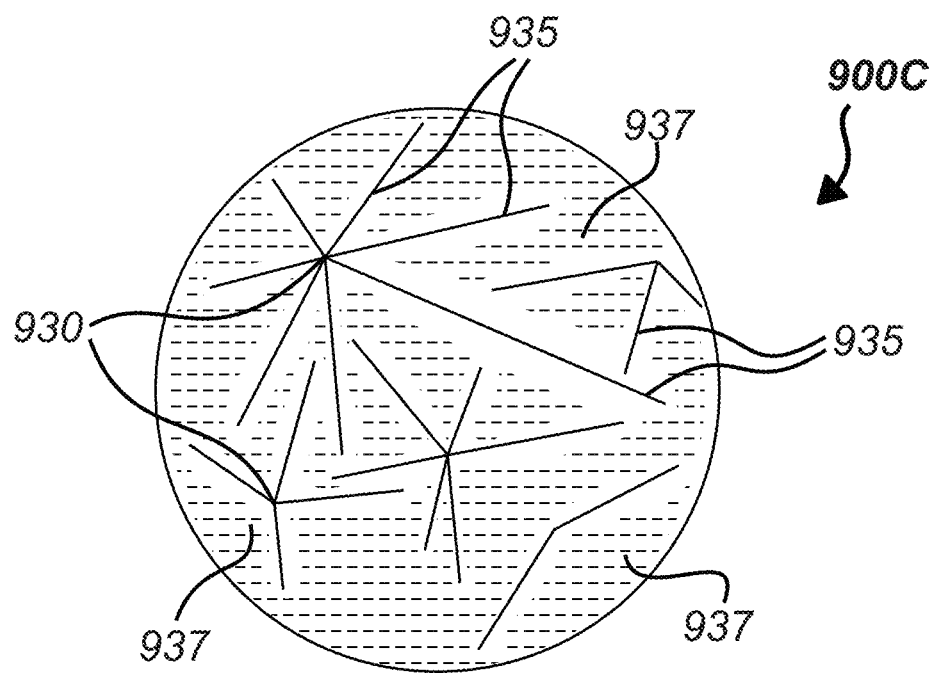

FIG. 9C depicts a data surface 900C having focal points 930 and lines 935 etched and/or printed thereon. In embodiments, various attributes of the focal points 930 and/or lines 935 represent encoded data. In one embodiment, encoded data 937 according to standard data recording techniques may be inserted between gaps in focal points 930 and lines 935. For example, in embodiments, encoded data 937 comprises pits that represent bits. In another embodiment, encoded data 937 comprises magnetic regions that represent bits.

In embodiments, lines 935 may comprise variable headings, where overlaps of lines 935 are either absolutely disallowed, are indicated with depth increases of lines 935, color changes, or other methods, or are absolutely allowed. In embodiments, a given surface can be represented in subsections, and these subsections can also be given an alignment based upon a 360 degrees allowance. Therefore, a pair of perfect squares can be represented such as one box wall being 90 degrees from the A axis, and the other being at 110 degrees for the same side of the second box. This would make them differentially aligned from each other. This schema allows for more possible data storage via the alignment changes.

According to some embodiments of the present disclosure, a memory substrate comprises glass portions. In embodiments, said glass portions comprise one or more colors, wherein the various colors represent data. In one embodiment, layers of glass may be stacked on the X, Y, and/or Z axis to be subsequently read therefrom.

According to some embodiments of the present disclosure, a memory substrate comprises one or more subsurface features that represent data. In one embodiment, said subsurface features comprise one or more lines or other shapes. In one embodiment, said subsurface features comprise one or more tunnels. In such embodiments, the location, angle, shape, quantity, orientation, and/or other characteristics of the subsurface features represent data.

In some embodiments, a memory substrate is formed by combining a variety of materials. In one embodiment, the types of materials represent data. Accordingly, data may be encoded in the arrangement of said various material types.

Figure 9D:
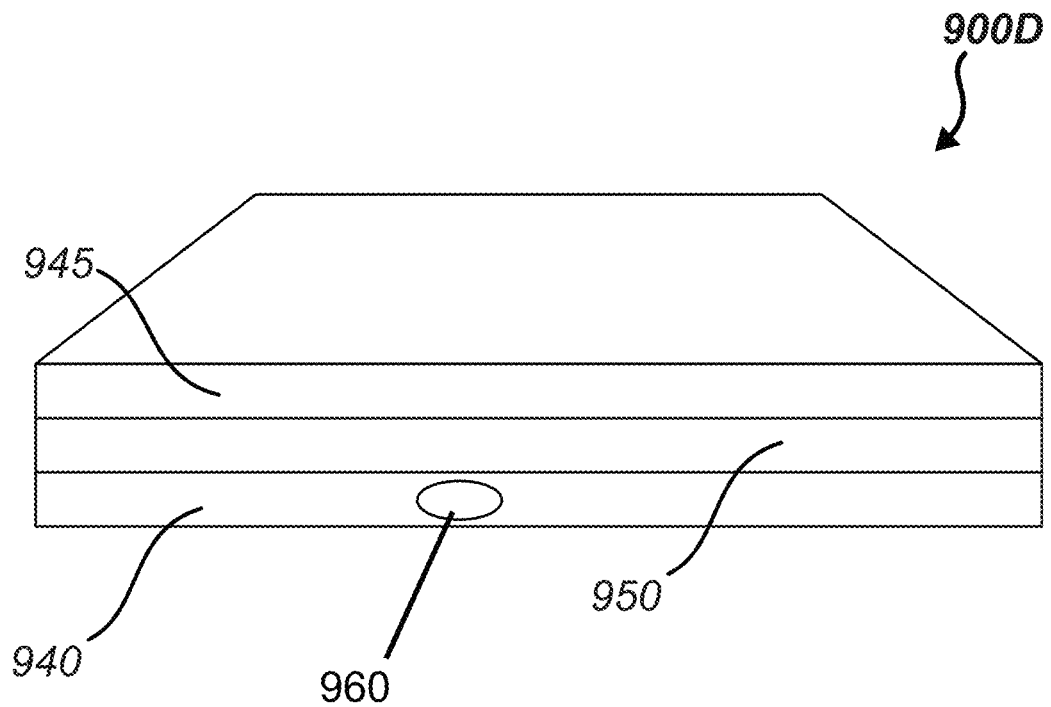

FIG. 9D depicts a memory device 900D having multiple memory layers 940, 945 separated by a spacer layer 950. In embodiments, one or more layers may comprise various data encoding techniques as set forth above. As depicted in FIG. 9D, one embodiment comprises a tunnel 960 that encodes data. It is to be understood that virtually any number of stacked memory layers may be assembled in a memory storage device. In embodiments, spacer layers may be used to allow the features to be read. In alternative embodiments, a three-dimensional feature can be read by sonar pulses or like means. Multiple data layers can be constructed layer by layer or by adding layers on top of existing memory schema.

In some embodiments of the present disclosure, a memory storage drive may be partitioned into two or more portions via physical or other means, where the size of the portions represent data. In one embodiment, the shapes of the respective partitions represent data.

One of ordinary skill in the art having the benefit of this disclosure may recognize certain benefits of some embodiments. For example, certain embodiments may provide an increased data capacity relative to current data storage techniques. Certain embodiments may exhibit relatively low error rates. Certain embodiments may not be susceptible to damage from an EMP. Certain embodiments may have long shelf lives relative to current device. Some embodiments may not require electricity when properly stored.

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A method for encoding data, comprising:
   inserting a signal gap in a transmission, where the signal gap represents encoded data, wherein:
   the signal gap is a virtual gap in the transmission; and
   a particular frequency of the transmission represents the virtual signal gap.

2. The method claim 1, wherein a duration of the signal gap or the location of the signal gap within the transmission represents the encoded data.

3. The method of claim 1, wherein a duration of the signal gap represents a second signal gap.

4. The method claim 1, wherein a pattern of multiple signal gaps, the multiple signal gaps including the signal gap, represents a second signal gap.

5. The method claim 1, wherein the transmission comprises multiple coordinated transmissions.

6. The method of claim 5, wherein the signal gap in the transmission is coordinated with a second signal gap in a second transmission of the multiple coordinated transmissions.

7. The method of claim 1, wherein a duration of the virtual signal gap or the location of the virtual signal gap within the transmission represents the encoded data.

8. The method of claim 1, wherein a duration of the virtual signal gap represents a second virtual signal gap.

9. The method of claim 1, wherein a pattern of multiple signal gaps, the multiple signal gaps including the signal gap, represents a second virtual signal gap.

10. The method of claim 1, wherein the transmission comprises multiple coordinated transmissions.

11. The method of claim 10, wherein the virtual signal gap in the transmission is coordinated with a second virtual signal gap in a second transmission of the multiple coordinated transmissions.

* * * * *